United States Patent [19]
Turiot et al.

[11] 4,422,604
[45] Dec. 27, 1983

[54] FUSELAGE LANDING GEAR WITH TANDEM WHEELS

[75] Inventors: André Turiot, Morsang S/Orge; Michel Derrien, Versailles, both of France

[73] Assignee: Messier-Hispano-Bugatti (S.A.), Montrouge, France

[21] Appl. No.: 354,010

[22] Filed: Mar. 2, 1982

[30] Foreign Application Priority Data

Mar. 5, 1981 [FR] France .............................. 81 04420

[51] Int. Cl.³ .............................................. B64C 25/14
[52] U.S. Cl. ............................................... 244/102 R
[58] Field of Search ......... 244/100 R, 102 R, 102 SS, 244/102 SL

[56] References Cited
U.S. PATENT DOCUMENTS

| | | | |
|---|---|---|---|
| 2,562,778 | 7/1951 | Egly | 244/102 SL |
| 3,904,153 | 9/1975 | Watts | 244/102 SL |
| 4,355,773 | 10/1982 | Masclet | 244/102 SL |

FOREIGN PATENT DOCUMENTS

| | | |
|---|---|---|
| 1465428 | 12/1966 | France . |
| 877505 | 9/1961 | United Kingdom . |
| 878385 | 9/1961 | United Kingdom . |
| 1042190 | 9/1966 | United Kingdom ............ 244/102 R |

*Primary Examiner*—Galen L. Barefoot
*Attorney, Agent, or Firm*—Sughrue, Mion, Zinn, Macpeak and Seas

[57] ABSTRACT

The landing gear for aircraft comprises at least two rocker beams respectively carrying wheels, the rocker beams being connected rigidly and respectively to two points of the rigid structure of the aircraft, each rocker beam being connected to two other rigid points of the aircraft structure by an assembly composed of a lever and a shock absorber mounted rotatably on each other, and a connecting rod of constant length connecting two levers and an actuating cylinder to rotate at least one of the two said levers. The landing gear finds a particularly advantageous application as a fuselage landing gear with tandem mounted wheels.

12 Claims, 4 Drawing Figures

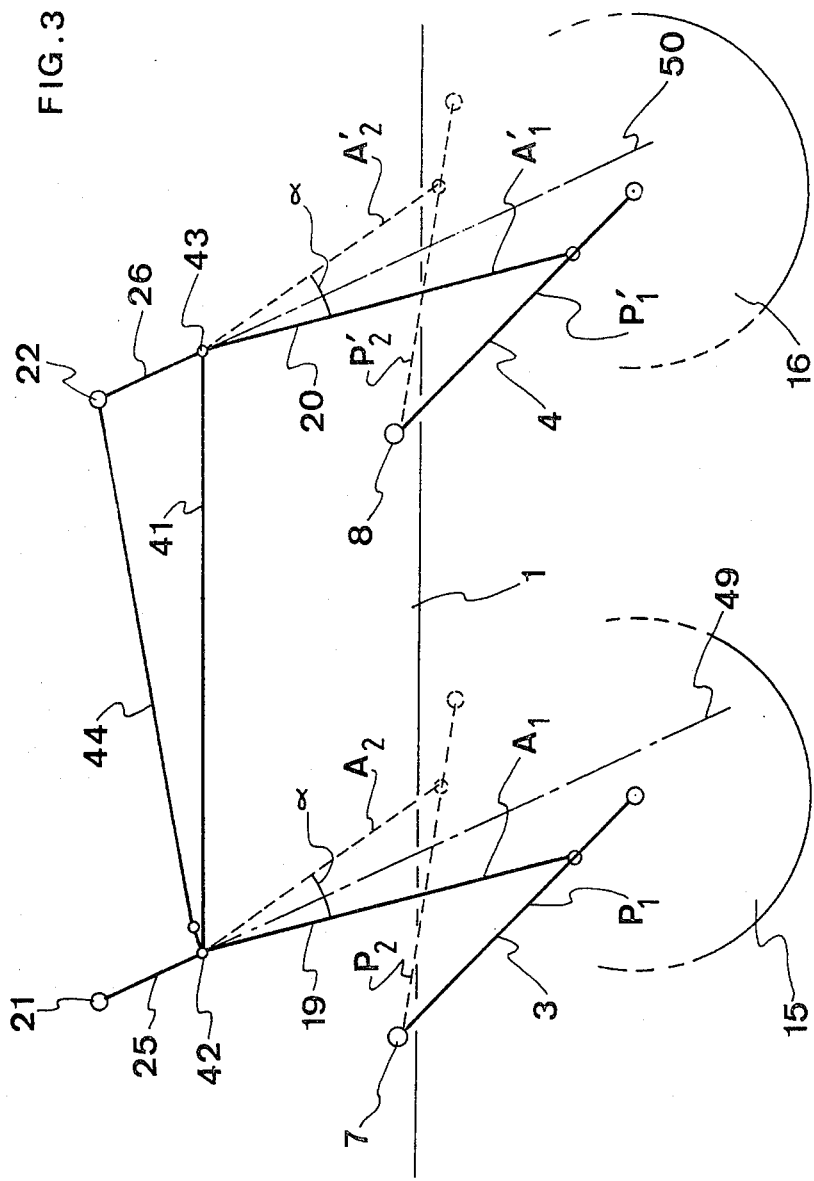

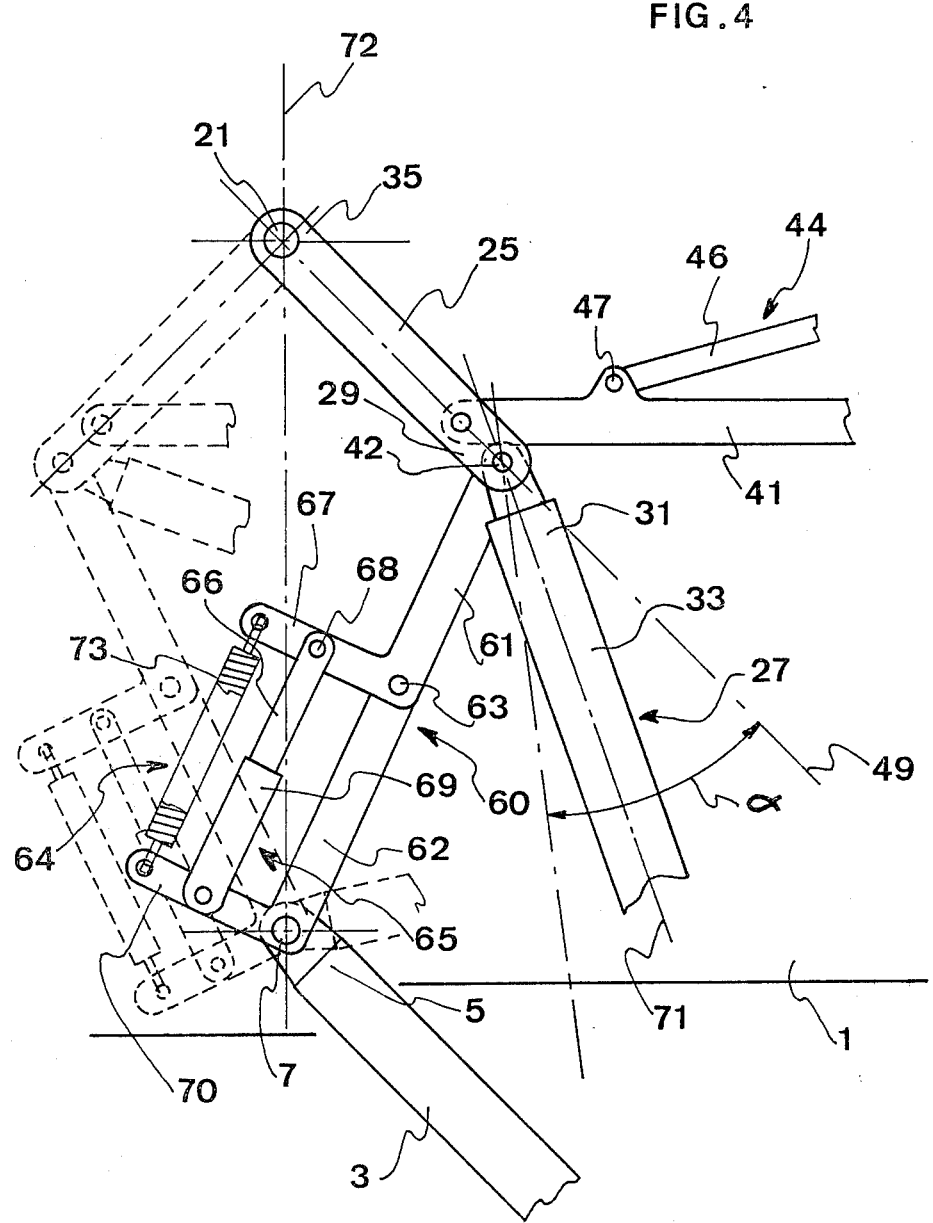

FUSELAGE LANDING GEAR WITH TANDEM WHEELS

CROSS REFERENCE TO RELATED APPLICATION

The present application relates to application Ser. No. 354009 filed on Mar. 2, 1982, and entitled "LANDING GEAR FOR AIRCRAFT" by Andre Turiot et al.

FIELD OF THE INVENTION

This invention relates to retractable landing gears and more particularly to the so-called fuselage landing gears with a set of wheels mounted in tandem.

BACKGROUND OF THE INVENTION

Embodiments of these landing gears are already known to the prior art. Such landing gears are generally installed on aircraft intended for very short trips and which are commonly referred to as commuters.

Among these prior-art embodiments, there are none which fulfill all the criteria regarding solidity, reliability, minimum size and manufacturing simplicity.

It is an essential object of this invention to overcome these drawbacks and to provide a main landing gear of the tandem fuselage type of simple design and also providing good reliability and good solidity while maintaining full safety.

SUMMARY OF THE INVENTION

More precisely, the object of the invention is to provide a landing gear of the so-called fuselage type with wheels mounted in tandem for an aircraft having a rigid structure, comprising at least two rocker beams capable of pivoting on one of their ends respectively around the first and second axes incorporated in the structure of the aircraft, the other end having means for supporting rolling means, first and second means of connection between first and second points respectively on the two said rocker beams to third and fourth pivoting points incorporated in the structure of said aircraft, each of said first and second connection means comprising a lever and a shock absorber connected to each other on one of their ends by a pivoting point, the ends of the two levers rotating together with the third and fourth points respectively, the other ends of the shock absorbers being respectively connected to the first and second points, means for linking the two levers comprising a connecting rod of constant length, and means for applying a force on at least one of the two said levers.

Other characteristics and advantages of the present invention will appear from the following description given with reference to the appended drawings.

BRIEF DESCRIPTION OF THE FIGURES

FIG. 3 is an explanatory diagram making it possible to understand the operation and advantages of a landing gear according to FIG. 1; and FIG. 4 is a side view which represents part of another embodiment of a landing gear according to the invention.

DESCRIPTION OF PREFERRED EMBODIMENTS

Figure 2:
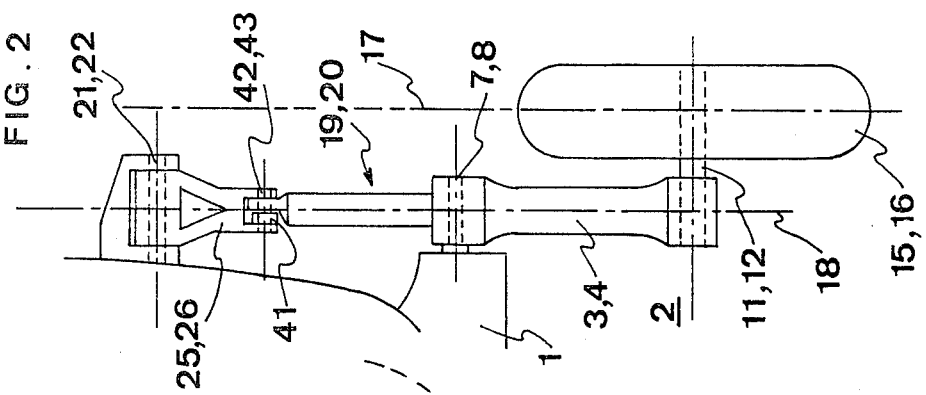
FIGS. 1 and 2 represent respectively, in a side view and a front view, an embodiment of a main landing gear according to the invention placed in an aircraft.

It is first of all pointed out that although the third figure is a schematic, all three figures represent a single and same embodiment of a main landing gear and consequently the same references will designate the same elements. It is also to be noted that in FIG. 1, the drawing in unbroken lines shows the landing gear in its "extended" position, while the drawing in dotted lines represents the landing gear in its "retracted" position.

Figure 1:
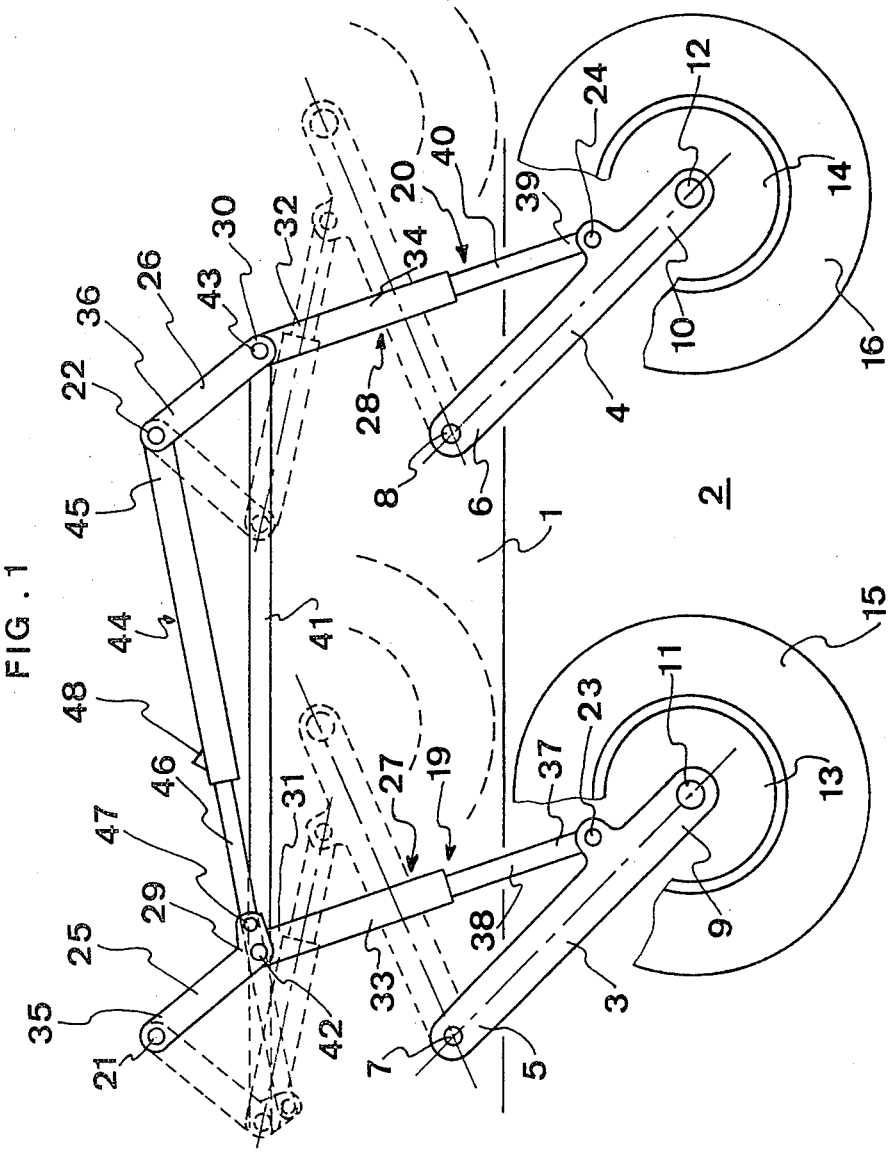

The embodiment of the landing gear illustrated in FIGS. 1 and 2 is intended for an aircraft represented schematically in the figures and comprising a rigid structure 1 forming a frame on which will be fixed the means for attaching the main landing gear 2. This main landing gear includes two rocker means 3, 4 each mounted on their end 5, 6 respectively for pivoting around two pins 7,8 incorporated in the aircraft structure 1.

The other end 9,10 of these two rocker beams 3,4 includes a support 11,12 for rolling means, for example a rim 13,14 on which is mounted a tire 15,16.

In FIG. 2 it is seen that the supporting means 11,12 make it possible to maintain the tires 15,16 away from the rocker beams and in a plane 17 at a distance from the general plane 18 of each rocker beam.

The landing gear also includes connection means 19,20 between two pivoting points 21,22 incorporated in the aircraft structure 1, and two other points 23,24 respectively incorporated in the rocker beams 3,4.

These two connection means 19,20 are substantially identical and each includes a lever 25,26 associated in rotation with a shock absorber 27,28. For this purpose, each end 29,30 of the levers 25,26 is mounted pivotably respectively at one end 31,32 preferably of the cylinder 33,34 of the shock absorbers 27,28, the other ends 35,36 of the two levers 25,26 being mounted pivotally respectively on the points 21,22 incorporated in the frame 1. The other ends of the shock absorbers 19,20, namely their rods 38,39, are connected pivotably to the points respectively incorporated in the two rocker beams 3,4.

The landing gear also includes a connecting rod 41 of constant length linking the two levers 25,26 respectively at pivoting points 42,43 so that the four points 21,22, 43,42 advantageously form a parallelogram. It is to be noted that the pivoting points of the levers in relation to the shock absorbers can be the same as the attachment points 42,43 of the connecting rod 41.

The means for attaching the two levers respectively to the points 21,22 and the rod 41 to the points 42,43 being free to rotate, the parallelogram defined above constitutes a deformable parallelogram.

It is deformed, for example, when a force is applied on one of the three elements forming the parallelogram, namely the two levers 25,26 and the connecting rod 41.

As will be described below, the means for directly or indirectly applying a force to these levers 25,26 to make them pivot respectively around the points 21,22 consist of an actuating cylinder 44 of which one end 45 can be fixed in rotation but advantageously on a fixed point of the aircraft structure 1, for example on the axis located at the point 22, while the other end 46 of the actuating cylinder 44 is fixed at a point 47 near the pivoting point 42 defined previously, whether on the lever 25 or on the connecting rod 41.

Similarly, it appears that the actuating cylinder 44 is located substantially along a diagonal of the parallelogram defined above.

Although not necessary, the points 21,22,42,43,47,7,8 are in the same plane 18, thereby allowing the component parts of this landing gear, which pivot, to be mounted on axes of rotation which are all substantially parallel, which unquestionably constitute a design advantage. The landing gear shown in FIGS. 1 and 2 operates in the following manner in going from its extended position to its retracted position and vice versa.

It is first of all assumed that the landing gear is in the extended position as shown in FIG. 1. To retract the landing gear from this position, the actuating cylinder 44 is operated so that its rod slides in its cylinder and so that the distance between these two ends increases.

Consequently, the lever 25 turns clockwise around its pivoting point 21 and also drives the lever 26 in the same rotation via the connecting rod 41.

These rotations of the two levers 25,26 exert a pulling force on the ends 31,32 of the cylinders of the two shock absorbers 27,28 which in turn produce the pivoting of the two rocker beams 3,4 but counterclockwise, contrary to the direction of the levers 25,26.

The rotation of the two levers 25,26 is produced by the actuating cylinder 44 until the two wheels of the landing gear have been retracted into the aircraft structure 1 and assume a position as illustrated in FIG. 1 in dotted lines. In this retracted position, the wheels are substantially located over a plane going respectively through the two attachment points 7,8 in pivoting.

It is of course obvious that when the aircraft is moving on a runway, it should not be possible for this landing gear to retract accidentally. For this purpose, the actuating cylinder 44 comprises controllable blocking means, such as jaws, shown schematically in the figure at 48.

In fact, this actuating cylinder is capable of being blocked in two given positions, corresponding respectively to the extended landing gear position and to the retracted landing gear position.

In FIG. 3, the different elements entering into the composition of the landing gear structure are shown schematically by line portions and this diagram shows other characteristics and advantages of the landing gear according to the invention.

It is in fact quite evident that when the aircraft is moving on a runway, it can encounter a rough surface or bumps which must not cause damage to the aircraft structure 1 nor subject the passengers to jolting.

Hence, when the aircraft is moving on the runway and encounters an obstacle, part of the shock is absorbed by the tires 15,16 and part by the shock absorbers 19,20.

In fact, in a known manner, when a shock is applied to the wheel of one of the two rocker beams 3,4 it pivots around its pin owing to the fact that the rod 39,40 of the shock absorbers 19,20 can penetrate into the cylinder 33,34.

The respective rocker beams 3 and 4 can thus pivot around their respective axis 7 or 8 substantially between two positions represented in FIG. 3 by P1 and P2 for the rocker beam 3 and by P'1 and P'2 for the rocker beam 4. These positions correspond to the two limit positions of the rocker beams when the shock absorbers are either in their expanded position or in their compressed position.

As stated earlier, when the landing gear is in its extended position, the actuating cylinder is blocked and consequently the levers 25,26 and the rod 41 are considered to be a rigid part of the aircraft structure 1 and hence do not undergo any deformation. It is thus understandable that part of the forces not absorbed by the shock absorbers is transmitted to the levers 25,26. These levers 25,26 are thus advantageously connected respectively to the shock absorbers 19,20 so that their general direction 49,50 forms, when they are in this rigid position with the landing gear extended, the bisector of the angle α swept by the shock absorbers 19,20, i.e. between their two limit positions A1,A'1–A2,A'2 (corresponding to the limit positions of the shock absorbers 25,26).

Thus, on average, the shock absorber is considered substantially in the extension of the lever with which it is associated and the force is transmitted in the axis of this lever. This lever is hence subjected to a relatively small torsion couple. This couple is in fact the smallest possible because, if the angle which formed the general direction 49,50 of these levers with that of the shock absorbers were different, it is unquestionable that the couple would then be much greater. It would thus be necessary to strengthen to a greater extent notably the pins 21,22, the actuating cylinder 44 and the connecting rod 41.

The embodiment of the landing gear just described can of course be modified without departing from the spirit of the invention. It is quite evident in particular that the attachment points, whether on the rigid aircraft structure or the different elements of the landing gear, will be determined and will be modifiable in order to optimize the reliability, weight and dimensions of this tandem fuselage landing gear especially in accordance with the configuration of the aircraft to be equipped.

The landing gear described above with reference to FIGS. 1 to 3 operates satisfactorily. It is however essential in certain cases, notably for aircraft carrying passengers, to provide the highest possible level of safety.

It is thus absolutely necessary for the landing gears to extend even when, for example, the actuating cylinder 44 is not supplied with hydraulic fluid and, when the landing gear is extended, that it be incapable of retracting while the aircraft is moving on the ground. To deal with this problem, the landing gear comprises locking means which can be actuated in at least the extended landing gear position and preferably in both positions, i.e. landing gear retracted and extended.

An embodiment of these means is illustrated in FIG. 4.

It is first of all pointed out that in the two embodiments according to FIGS. 1 to 3 and FIG. 4 the elements which are common to both bear the same references. Similarly, in the preceding representations, the unbroken lines represent the landing gear in its extended position and the dotted lines represent the landing gear in its retracted position.

These means thus comprise a "breaking" strut 60 connecting at least one rigid point of the aircraft structure 1 to a lever of the deformable parallelogram as defined previously. Advantageously, this point is the one on which are fixed in rotation the rocker beams, such as the rocker beam 3, i.e. the point 7. In this case, the lever to which the strut 60 is connected is the one which cooperates with this rocker beam. This is done essentially to limit the space requirements.

More precisely, the breaking strut 60 comprises at least two links 61 and 62 mounted pivotably on each other around an axis of rotation 63, and means 64 for applying a force couple on these two links in order to obtain the rotation of one in relation to the other in a desired manner.

These means 64 consist of an auxiliary actuating cylinder 65 of which one end, namely the rod 66, is fixed rotatably on an offset lug 67 integral with the link 61 at a point 68 different from the point of rotation 63. The other end of the actuating cylinder 65, namely the cylinder 69, is fixed rotatably on the link 62, for example also but not necessarily on an offset lug 70 integral with this link 62.

It is moreover quite evident that the length of this strut 60 is determined so that the angle formed by the three points 7, 21 and 42 defines the landing gear in its extended position as desired and that moreover the direction 71 of the shock absorber 27 is always on the same side of the direction 49 of the lever 25 when the shock absorber sweeps the angle α during the absorption of the rotations of the rocker beam 3. In this manner, the forces transmitted by the shock absorber to the lever 25 always tend to position it so that it pulls on the strut 60.

In this case, the landing gear remains perfectly blocked when it is in the extended position and is not liable to retract accidentally.

On the other hand, to retract the landing gear, the actuating cylinder 65 is operated so that it extends and hence tends to swivel the link 61 in relation to the link 62 to reduce the distance between the two points 7 and 42. Under the action of this force couple, and under the action of the force exerted at the same time by the actuating cylinder 44, the lever 25 swivels around the point 21 and, as explained earlier, the other lever 26 rotates at the same time around the point 22. Once the two links 61 and 62 have been disaligned by the actuating cylinder 65, the actuating cylinder 44 continues to be operated to bring the landing gear to its final retracted position as shown partially in dotted line in FIG. 4. In this position, the end 29 of the lever 25, when it has passed the line 72 defined by the two points 7 and 21, again pulls on the links 61 and 62 tending to realign them. In this position, the landing gear is blocked and cannot extend by itself, this position even being favored by the action of a tension spring 73 connected to the two lugs 67, 70.

Similarly, to go from the retracted landing gear position to the extended position, in a first phase both the actuating cylinder 65 and the actuating cylinder 44 are operated to disalign respectively the two links 61 and 62 and rotate the lever 25 and, in a second phase, only the actuating cylinder 44 is operated in order to bring the lever to the landing gear extension position, this change-over moreover being favored as of the line 72 by the tension of the spring 73.

With a landing gear like the one illustrated in FIG. 4, even in the event of a failure in the pressurized oil supply lines for example, the pilot can, by means of an auxiliary lever, break only the alignment of the links 61 and 62, thereby rotating the lever 25 toward its landing gear extension position. The weight of the component elements of the landing gear leads to its complete extension, aided in this by the spring 73 which contributes to the alignment of the two links 61 and 62 and brings the lever 25 to its position as shown in FIG. 4 for the extended landing gear position.

The lever 26 of course follows the same trajectory because it is connected by the connecting rod 41 to the lever 25.

It is consequently seen that this landing gear provides full safety and notably the assurance of extending even in the absence of actuating cylinder drive fluid, and especially that it will block in this position and remain there permanently.

What is claimed is:

1. Landing gear of the so-called fuselage type with wheels mounted in tandem for an aircraft having a rigid structure, said landing gear comprising; at least two rocker beams, means for mounting one of the ends of said beams, respectively around two first and second pivot axes incorporated in the structure of the aircraft, means for supporting rolling means on the other ends of said rocker beams, first and second connection means connected between first and second points respectively on the two said rocker beams to third and fourth pivoting points incorporated in the structure of said aircraft, each of said first and second connection means comprising a lever and a shock absorber connected to each other on one of their ends by a pivoting point, the ends of the two levers rotating together with the third and fourth points respectively, the other ends of the shock absorber being respectively connected to the first and second points, a connecting rod of constant length linking the two levers, means for applying a force on at least one of the two said levers, said means for applying a force on at least one of the two said levers consisting of an actuating cylinder having a first end connected in rotation to a rigid point of the aircraft structure, means for applying the force of the second end of said actuating cylinder to at least one lever, said actuating cylinder taking on at least two positions determining two limit lengths, said two limit lengths corresponding respectively to retracted and extended positions of the landing gear, and wherein the first end of said actuating cylinder is fixed on one said third and fourth points incorporated in the rigid structure of the aircraft.

2. The landing gear of claim 1 wherein said actuating cylinder has at least blocking means controllable in one position.

3. The landing gear of claim 2 wherein said blocking means are of the jaw type.

4. The landing gear of claim 1 further comprising means for locking it in at least one of the retracted and extended positions.

5. The landing gear of claim 4 wherein said locking means comprise a "breaking" strut of fixed length connecting a fifth fixed point on the structure of said aircraft to a sixth point of any of the two levers.

6. The landing gear of claim 5 wherein said breaking strut is made up of at least two links mounted rotatably one over the other, each of the two said links cooperating in rotation with the fifth and sixth points.

7. The landing gear of either of claims 5 or 6 wherein said fifth point coincides with one of the two said first and second points, the sixth point being located on the lever which is operating with the shock absorber connected to the rocker beam pivoting around the point on which said sixth point is located.

8. The landing gear of claim 6 further comprising means for exerting a first force couple on the two said links to rotate them in relation to each other.

9. The landing gear of claim 8 wherein said means include at least one actuating cylinder and means for connecting the two ends of said actuating cylinder with the two said links at points not coinciding with the one corresponding to the pivoting of the two said links in relation to each other.

10. The landing gear of claim 9 wherein said actuating cylinder includes means for determining the length of its stroke.

11. The landing gear of claim 8 further comprising at least one tension spring exerting a second force couple on the two said links to load them constantly so as to rotate in the same direction.

12. Landing gear of the so-called fuselage type with wheels mounted in tandem for an aircraft having a rigid structure, said landing gear comprising; at least two rocker beams, means for mounting one of the ends of said beams, respectively around two first and second pivot axes incorporated in the structure of the aircraft, means for supporting rolling means on the other ends of said rocker beams, first and second connection means connected between first and second points respectively on the two said rocker beams to third and fourth pivoting points incorporated in the structure of said aircraft, each of said first and second connection means comprising a lever and a shock absorber connected to each other on one of their ends by a pivoting point, the ends of the two levers rotating together with the third and fourth points respectively, the other ends of the shock absorber being respectively connected to the first and second points, a connecting rod of constant length linking the two levers, means for applying a force on at least one of the two said levers, said means for applying a force on at least one of the two said levers consisting of an actuating cylinder having a first end connected in rotation to a rigid point of the aircraft structure, means for applying the force of the second end of said actuating cylinder to at least one lever, said actuating cylinder taking on at least two positions determining two limit lengths, said two limit lengths corresponding respectively to retracted and extended positions of the landing gear, and wherein when said actuating cylinder is operated so that its length determines the extended landing gear position, said levers extend in the direction such that the lever forms substantially the bisector of the angle swept by said shock absorber, with which said lever is associated in rotation, when this shock absorber is driven in rotation by the pivoting of the rocker beam with which it is associated during the absorption of shocks.

* * * * *